United States Patent [19]

Matsubayashi et al.

[11] Patent Number: 4,623,167

[45] Date of Patent: Nov. 18, 1986

[54] VEHICLE FRAME CONSTRUCTION FOR BUGGIES WITH RIDING SADDLES

[75] Inventors: Shinji Matsubayashi, Tokyo; Tsuneo Kajikawa; Shokichi Arai, both of Saitama, all of Japan

[73] Assignee: Honda Giken Kogyo Kabushiki Kaisha, Tokyo, Japan

[21] Appl. No.: 650,028

[22] Filed: Sep. 13, 1984

[30] Foreign Application Priority Data

Sep. 13, 1983 [JP] Japan ................. 58-168856

[51] Int. Cl.⁴ ............................................. B62D 21/00
[52] U.S. Cl. ..................................... 280/798; 280/282
[58] Field of Search ................... 280/798, 282, 281 R, 280/267, 269; 180/225, 210, 311, 312, 908, 241, 251; 403/230

[56] References Cited

U.S. PATENT DOCUMENTS

| | | | |
|---|---|---|---|
| 588,361 | 8/1897 | Shurz | 280/269 |
| 2,618,427 | 11/1952 | Langley et al. | 403/230 |
| 3,475,044 | 10/1969 | Konstant | 403/230 |
| 4,392,536 | 7/1983 | Iwai et al. | 280/282 |
| 4,453,616 | 6/1984 | Porter | 180/210 |
| 4,535,869 | 8/1985 | Tsutsumikoshi et al. | 180/311 |

FOREIGN PATENT DOCUMENTS 1364860 8/1974 United Kingdom .............. 280/282

Primary Examiner—John J. Love
Assistant Examiner—Ross Weaver
Attorney, Agent, or Firm—Armstrong, Nikaido, Marmelstein & Kubovcik

[57] ABSTRACT

A vehicle frame construction in a buggy with a riding saddle, includes a main frame extending longitudinally along a central axis of the buggy, the main frame having front and rear ends, and a pair of down tubes disposed one on each side of the main frame and having one ends fixed to sides of the front end of the main frame and opposite ends fixed to sides of the rear end of the main frame. Each of the down tubes is composed of a downwardly directed portion extending downwardly from the front end of the main frame and in a forward direction of the buggy, a horizontal portion extending substantially horizontally from the downwardly directed portion in a rearward direction of the buggy, and an upwardly directed portion extending substantially vertically upwardly from the horizontal portion to the rear end of the main frame. Each of the down tubes includes a curved portion between the downwardly directed portion and the horizontal portion, the downwardly directed portion and the horizontal portion having axes extending at an acute angle with respect to each other. A reinforcement pipe is detachably coupled between the downwardly directed portion and the horizontal portion of each of the down tubes.

6 Claims, 30 Drawing Figures

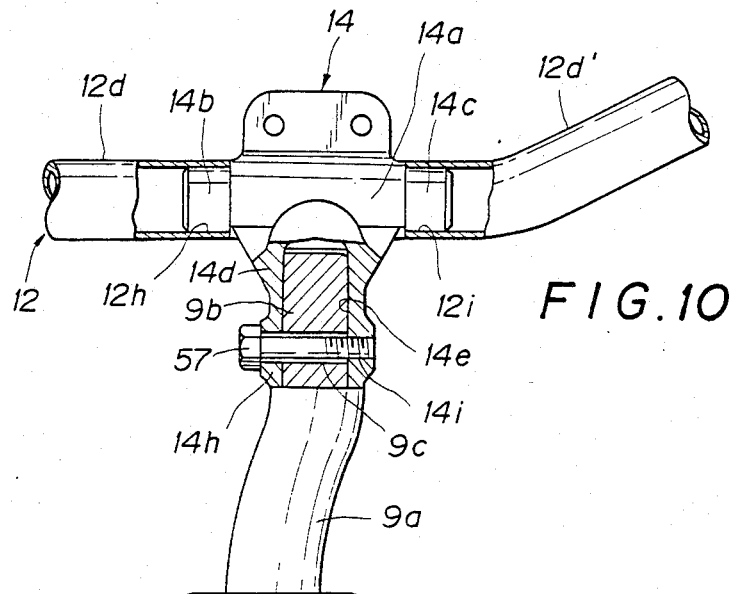
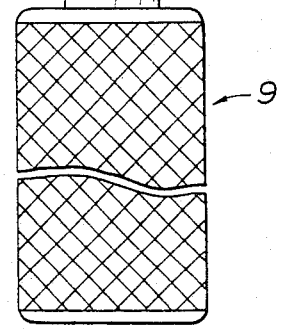
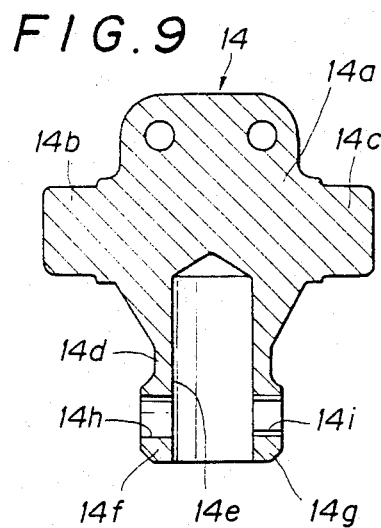
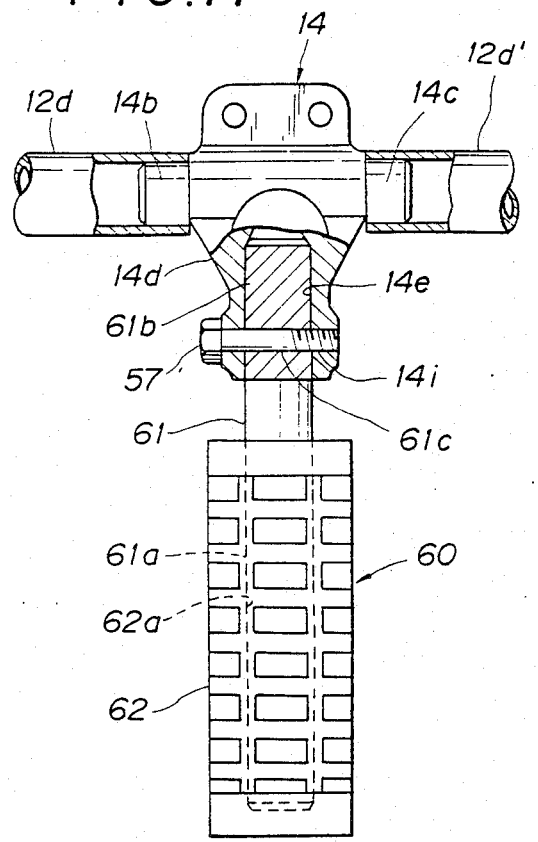

VEHICLE FRAME CONSTRUCTION FOR BUGGIES WITH RIDING SADDLES

BACKGROUND OF THE INVENTION

1. Field of the Invention

The present invention relates to a buggy with a riding saddle, and more particularly to a vehicle frame construction for a buggy with a riding saddle.

2. Description of the Prior Art

Buggies with riding saddles have in recent years found increasing use as vehicles for leisure and utility use. The buggy is normally of a three-wheeled or four-wheeled arrangement with one or two front wheels and two rear wheels, and has a lightweight and simple construction designed for use on all kinds of terrain.

In order to provide for running on rough terrain, the three-wheeled or four-wheeled buggy has a two-wheeled-motorcycle-like frame construction composed of a pipe frame, a bar handle, a riding saddle or seat, and other frame members to render the frame construction lightweight and simple. The buggy also has low-pressure baloon tires to lend itself to running on soft or loose terrain. The drive wheels are interconnected by a single drive axle with no differential mounted thereon. When the vehicle is turned on rough terrain or runs over an obstacle, the driver shifts his or her weight to control and enjoy maneuvering of the vehicle.

With the pipe frame construction for the lightweight and simple vehicle frame, a down tube which is a main frame skeleton member has to be bent three-dimensionally. The down tube thus shaped is required to be as simple as possible in construction so as to reduce the weight thereof, and at the same time the vehicle frame is required to be sufficiently rigid. The down tube however should not obstruct the worker's activity to maintain or service the engine on the vehicle.

SUMMARY OF THE INVENTION

With the foregoing requirements in view, it is an object of the present invention to provide a vehicle frame construction for buggies with riding saddles which includes down tubes of a simple construction that serve as main frame skeleton members of the frame construction, for reducing the weight of the down tube and at the same time rendering the frame construction rigid enough.

Another object of the present invention is to provide a vehicle frame construction for buggies with riding saddles which includes a down tube and other frame members that are designed not to obstruct the activity to maintain or service the engine of the buggy.

According to the present invention, there is provided a vehicle frame construction in a buggy with a riding saddle, comprising a main frame extending longitudinally along a central axis of the buggy, said main frame having front and rear ends, a pair of down tubes disposed one on each side of said main frame and having one ends fixed to sides of said front end of said main frame and opposite ends fixed to sides of said rear end of said main frame, each of said down tubes being composed of a downwardly directed portion extending downwardly from said front end of said main frame and in a forward direction of the buggy, a horizontal portion extending substantially horizontally from said downwardly directed portion in a rearward direction of said buggy, and an upwardly directed portion extending substantially vertically upwardly from said horizontal portion to said rear end of said main frame, each of said down tubes including a curved portion between said downwardly directed portion and said horizontal portion, said downwardly directed portion and said horizontal portion having axes extending at an acute angle with respect to each other, and a first reinforcement pipe detachably coupled between said downwardly directed portion and said horizontal portion of each of said down tubes.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a cross-sectional view of taken along line 9—9 of FIG. 8;

FIG. 10 is a fragmentary plan view, partly in cross section, of the joint of FIG. 7 with the down tube and a footrest;

FIG. 11 is a fragmentary plan view, partly in cross section, showing a footrest of another embodiment secured to the joint of FIG. 7;

DESCRIPTION OF THE PREFERRED EMBODIMENTS

Figure 1:
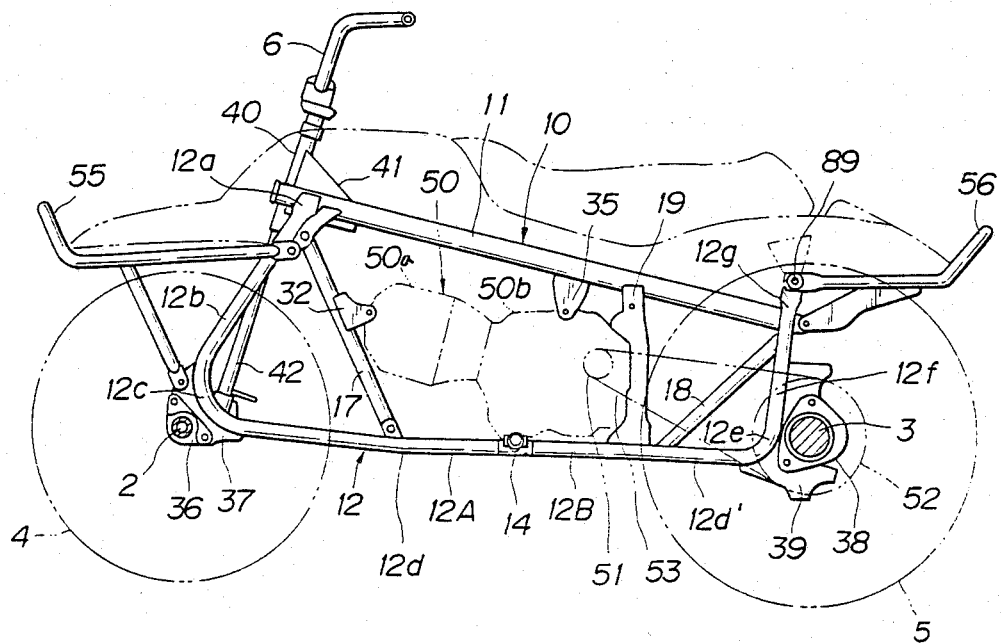
FIG. 1 is a side elevational view of a vehicle frame for a four-wheeled buggy according to an embodiment of the present invention.
Figure 2:
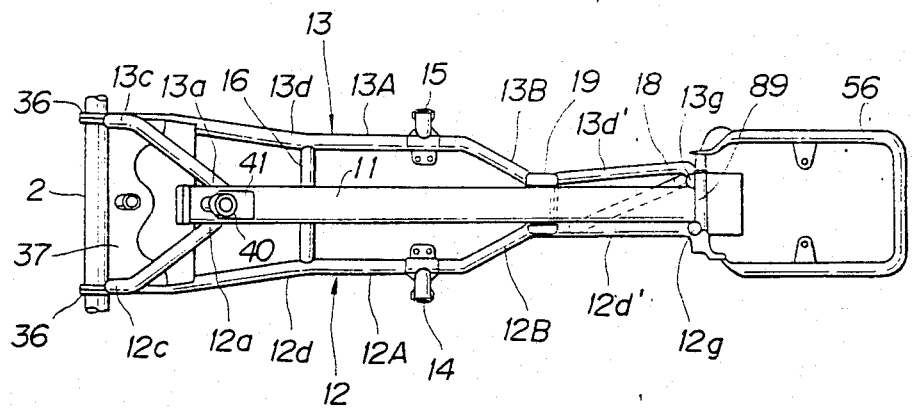
FIG. 2 is a plan view of the vehicle frame shown in FIG. 1.

As shown in FIGS. 1 and 2, a frame construction 10 as for a four-wheeled motor vehicle such as buggy for offroad use is generally composed of a main frame 11, a pair of down tubes 12, 13 extending one on each side of and downwardly from the main frame 11 and secured thereto, and reinforcing members such as a cross pipe 16, gusset pipes 17, 18, and a bracket 19. The main frame 11 is in the form of a straight pipe having a rectangular cross section and extending along a longitudinal central axis of the motor vehicle with a rear end inclined slightly downwardly. The down tubes 12, 13 comprise pipes of round cross section bent three-dimensionally.

The down tube 12 has an end 12a welded to one side (lefthand as shown in FIG. 2) of a front end portion of the main pipe 11, a downwardly directed portion 12b extending downwardly from the end 12a and inclined slightly forward and laterally, a horizontal portion 12d oriented substantially horizontally in a rearward direction from the downwardly directed portion 12b through a front curved portion 12c, and an upwardly directed portion 12f disposed in a rear portion of the motor vehicle and extending upwardly through a rear curved portion 12e from the horizontal portion 12d along the longitudinal central axis of the motor vehicle, the upwardly directed portion 12f having a terminal end 12g welded to one side (lefthand as shown in FIG. 2) of a rear end portion of the main pipe 11. The downwardly directed portion 12b and the horizontal portion 12d with the curved portion 12c joined therebetween have their own axes directed at an acute angle. The down tube 13 is of the same configuration as that of the down tube 12 and has ends 13a, 13g welded to one side (righthand as shown in FIG. 2) of front and rear end portions of the main tube 11.

The main frame 11 and the pair of down tubes 12, 13 jointly constitute a main skeleton of the vehicle frame 11. The rectangular pipe is suitable for use as the main frame 11 since it is highly resistant to strains tending to bend the same three-dimensionally, can freely select the ratio of width to height thereof as desired, and has flat side surfaces allowing easy attachement of various parts thereto. The round pipes are suitable for use as the three-dimensionally bent down tubes 12, 13 since they are easier to be bent three-dimensionally than the rectangular pipe. For these reasons, the main frame 11 comprises the rectangular pipe and the down tubes 12, 13 comprise the round pipes.

The down tubes 12, 13 which are bent three-dimensionally are susceptible to welding distortion. To cope with this problem, the down tubes 12, 13 are divided into respective front down tubes 12A, 13A and respective rear down tubes 12B, 13B, which are separated at substantially central portions of the horizontal portions thereof. The front down tubes 12A, 13A and the rear down tubes 12B, 13B are joined together by joints 14, 15 in the final process for assembling the vehicle frame 10.

Figure 7:
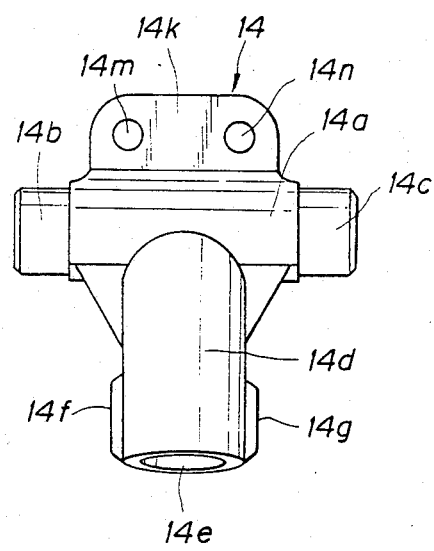
FIG. 7 is a plan view of a joint for connecting a down tube of the vehicle frame illustrated in FIG. 2.
Figure 8:
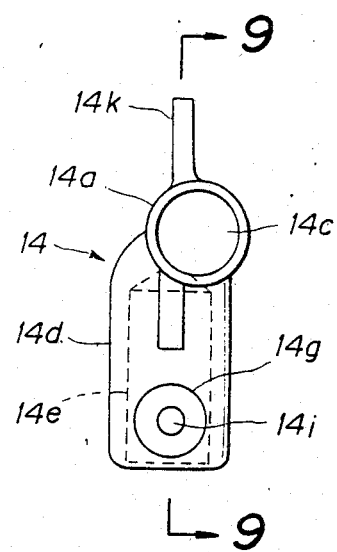
FIG. 8 is a side elevational view of the joint of FIG. 7.

As shown in FIG. 7, the joint 14 is shaped substantially as a T when viewed in plan. The joint 14 comprises a solid cylindrical shaft 14a having opposite ends 14b, 14c of such an outside diameter that the ends 14b, 14c are fitted in open ends of horizontal portions 12d, 12d' of the front and rear down tubes 12A, 12B. A tubular bracket 14d projects laterally from a substantially central portion of the shaft 14a and has an axial hole 14e as shown in FIGS. 8 and 9. The bracket 14d includes a pair of bosses 14f, 14g disposed in diametrically opposite relation to each other and having axes parallel to the shaft 14a.

The boss 14f has a bolt insertion hole 14h opening diametrically of the hole 14e, and the boss 14g has an intgernally threaded hole 14i opening diametrically of the hole 14e and aligned with the bolt insertion hole 14h in the boss 14f. A rectangular bracket 14k in the form of a plate projects from the shaft 14a in a substantially diametrically opposite relation to the tubular bracket 14d. The bracket 14k has through holes 14m, 14n defined therein. The joint 14 is formed as an integral construction by casting or forging iron. The joint 15 is shaped and formed in the same manner as the joint 14.

The front and rear down tubes 12A, 12B and 13A, 13B of the down tubes 12, 13 are interconnected by the joints 14, 15, respectively. More specifically, as shown in FIG. 10, the ends 14b, 14c of the shaft 14a of the joint 14 are fitted respectively in the open end 12h of the horizontal portion 12d of the front down tube 12A and the open end 12i of the horizontal portion 12d' of the rear down tube 12B, and the fitted parts are welded together into the down tube 12 with the bracket 14d directed outwardly of the frame 10. The front and rear down tubes 12A, 12B and the joint 14 are welded together in the final process of assembling the vehicle frame 10 in order to remove any unwanted welding distortion. The front and rear down tubes 13A, 13B of the other down tube 13 are joined together by being welded to the joint 15 (FIG. 2) in the same manner as described above with respect to the down tube 12.

With the down tubes 12, 13 thus constructed, the vehicle frame 10 can be assembled and welded with a required degree of dimensional accuracy and increased ease.

As is clearly shown in FIG. 10, an end 9b of a bar 9a of a footrest 9 is fitted into the hole 14e in the bracket 14d of the joint 14, and a bolt insertion hole 9c defined diametrically across the end 9b is brought into registry with the hole 14h and the threaded hole 14i in the bracket 14e. Then, a bolt 57 is inserted through the hole 14h and then the hole 9c threaded into the threaded hole 14i, thus fastening the footrest 9 to the joint 14. Another footrest is also secured to the joint 15 in the same manner. Since the joints 14, 15 double as footrest holders, the number of parts required is reduced and the overall frame construction is rendered lightweight. The bolt 57 only serves to prevent the footrest bar 9a from rotating with respect to and being detached from the joint 14, but not as a reinforcing member for the vehicle frame 10. Therefore, the bolt 57 can be a single bolt for easy attachment and detachment of the footrest 9 to and from the vehicle frame 10.

FIG. 11 is illustrative of a footrest of another embodiment which is attached to the joint 14. The footrest which is generally denoted at 60 includes a solid cylindrical straight bar 61 having a portion extending from a substantially central portion to an end 61a and inserted in a hole 62a defined in a rubber footrest member 62. The bar 61 has an end 61b having a bolt insertion hole 61c defined diametrically therethrough. The end 61b of the bar 61 is fitted into the hole 14e in the bracket 14d of the joint 14, and the footrest 60 is fastened to the bracket 14d by the bolt 57.

Figure 3:
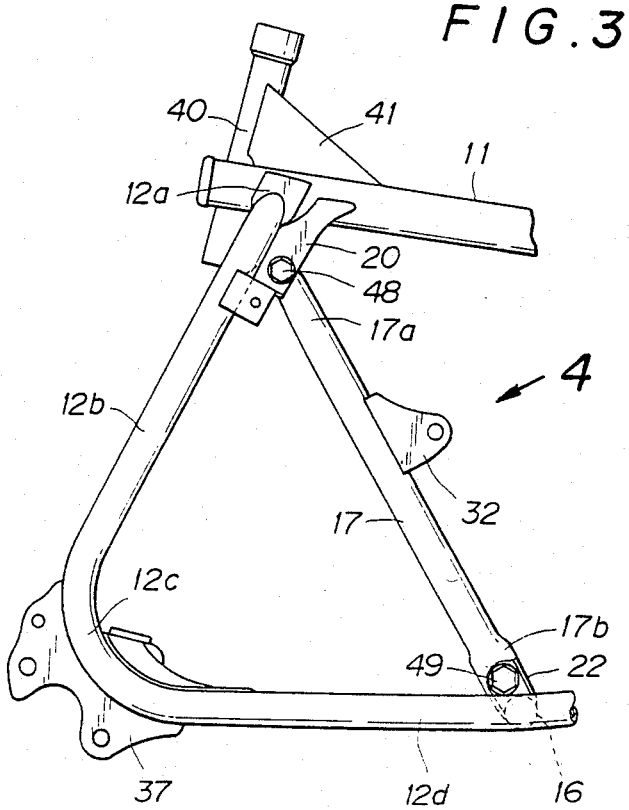
FIG. 3 is an enlarged side elevational view of a gusset pipe fastened in place for reinforcing the vehicle frame illustrated in FIG. 1.
Figure 4:
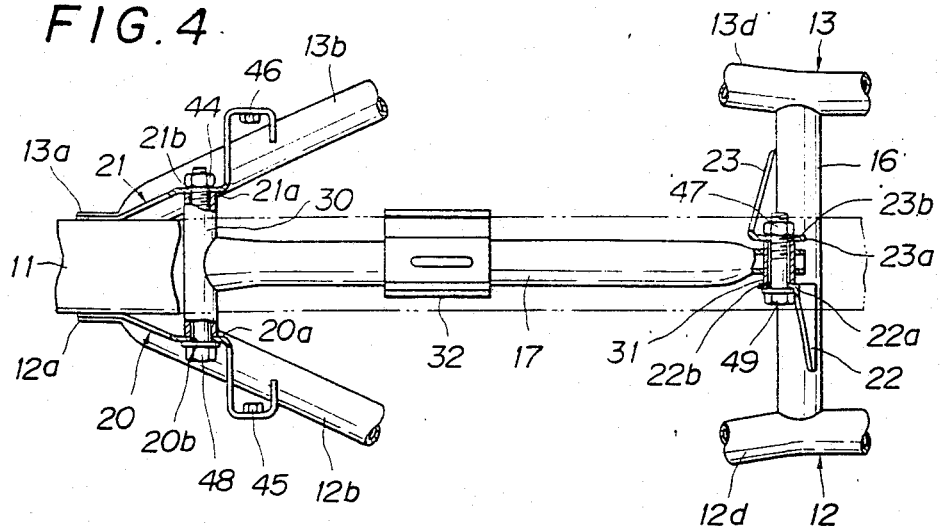
FIG. 4 is a fragmentary view taken in the direction of the arrow 4 of FIG. 3.

As illustrated in FIGS. 3 and 4, gusset plates 20, 21 are welded in confronting and spaced relation between the ends 12a, 13a of the down tubes 12, 13 and the sides of the main frame 11. The gusset plates 20, 21 have confronting panels 20a, 21a, respectively, having substantially central bolt insertion holes 20b, 21b defined respectively therein in registry with each other, as shown in FIG. 4. A nut 44 is welded to one of the gussets 21 in aligned relation to the hole 21a. The gusset plates 20, 21 also have bolt insertion holes (not shown) defined in ends thereof for attachment of a front carrier, with nuts 45, 46 welded to the gusset plates 20, 21 in alignment with the bot insertion holes.

As shown in FIGS. 2 and 4, a substantially horizontal cross pipe 16 extends between and is secured to the horizotnal portions 12d, 13d of the front down tubes 12A, 13A of the down tubes 12, 13. In FIG. 4, a pair of substantially L-shaped brackets 22, 23 is fixed to an upper portion of the cross pipe 16, the brackets 22, 23 having panels 22a, 23a disposed one on each side of the central axis of the vehicle and spaced a distance in confronting relation to each other. The confronting panels 22a, 23a have substantially central bolt insertion holes 22b, 23b defined respectively therein, with a nut 47 welded to the bracket 23 in alignment with the hole 23b.

Figure 5:
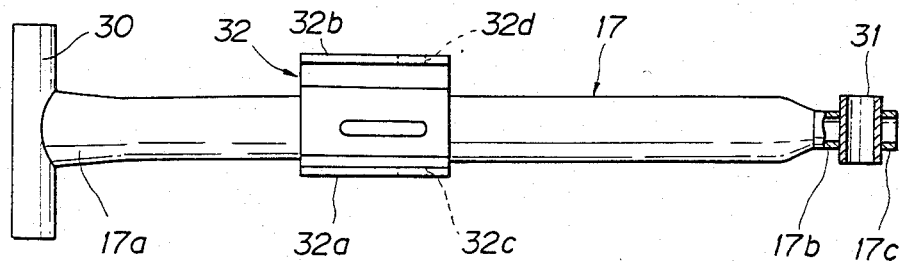
FIG. 5 is a plan view of the gusset pipe of FIG. 3.
Figure 6:
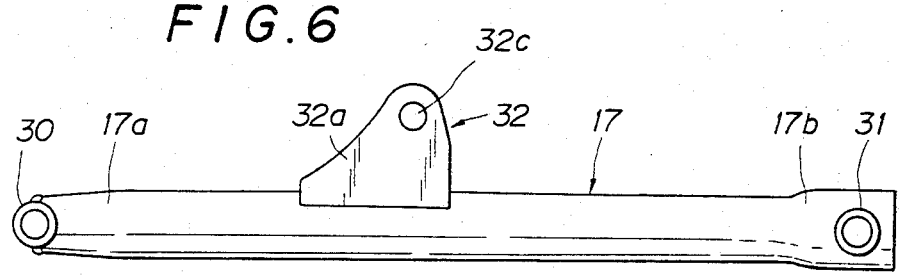
FIG. 6 is a side elevational view of the gusset pipe of FIG. 3.

Between the gusset plates 20, 21 and the brackets 22, 23 of the cross pipe 16, there extends a gusset pipe 17 serving as a reinforcement member detachably secured thereto. As shown in FIGS. 5 and 6, a pipe 30 is welded to one end 17a of the gusset pipe 17 in perpendicular relation thereto. The gusset pipe 17 has a flat opposite end 17b of a substantially elliptical cross section with a hole 17c defined therein. A pipe 31 extends through the hole 17c parallel to the pipe 30 and is welded to the pipe end 17b. The pipe 30 has a length dimensioned so that it can be inserted between the confronting panels 20a, 21a of the gusset plates 20, 21. The pipe 31 has a length such that it can be inserted between the confronting panels 22a, 23a of the brackets 22, 23 on the cross pipe 16.

A bracket 32 of a substantially U-shaped cross section is welded to a substantially central outer peripheral surface of the gusset pipe 17 and extends in a direction normal to the gusset pipe 17 and the pipes 30, 31. The bracket 32 has confronting legs 32a, 32b with holes 32c, 32d defined respectively therein in registry with each other. The bracket 32 serves to secure the head of an engine mounted in the vehicle frame, as described later on.

As shown in FIGS. 3 and 4, the gusset pipe 17 is placed between the gusset plates 20, 21 welded to the ends of the down tubes 12, 13 and the brackets 22, 23 welded to the cross pipe 16. The pipe 30 on the end 17a of the gusset pipe 17 is inserted between the gusset plates 20, 21 and then brought into registry with the holes 20a, 21a in the gusset plates 20, 21. A bolt 48 is inserted through the gusset plate 20 into threaded engagement with the nut 44 on the gusset 21, thus attaching the gusset pipe 17 to the gusset plates 20, 21.

The pipe 31 on the end 17b of the gusset pipe 17 is thereafter inserted between the confronting panels 22a, 23a of the brackets 22, 23 on the cross pipe 16, and then brought into registry with the holes 22b, 23b in the brackets 22, 23. A bolt 49 is inserted through the bracket 22 into threaded engagement with the nut 47, thereby fixing the gusset pipe 17 to the brackets 22, 23.

The down tubes 12, 13 are therefore reinforced by the gusset pipes 17 detachably secured through the gusset plates 20, 21 and the cross pipe 16 to and between the downwardly directed portions 12b, 13b and the horizontal portions 12d, 13d, with the curved portions 12c, 13c joined therebetween, of the down tubes 12, 13.

Figure 12:
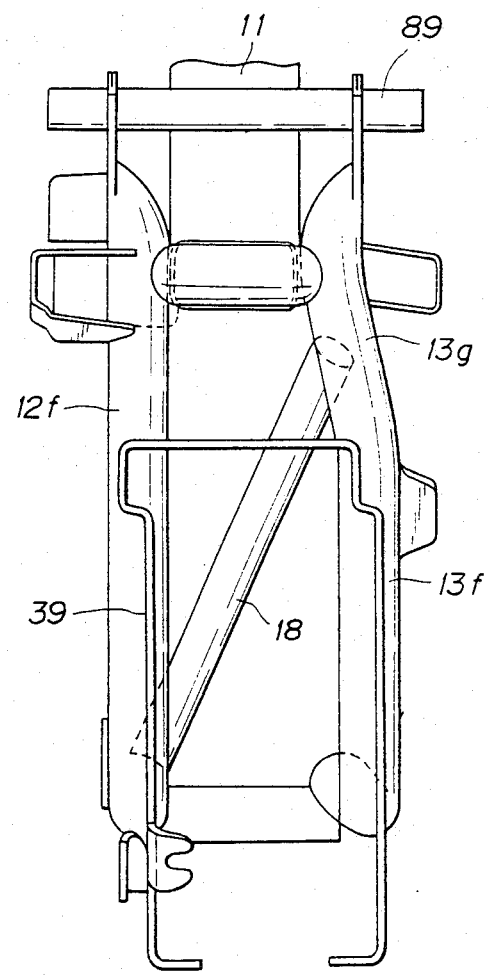
FIG. 12 is a rear elevational view of the vehicle frame of FIG. 2.
Figure 14:
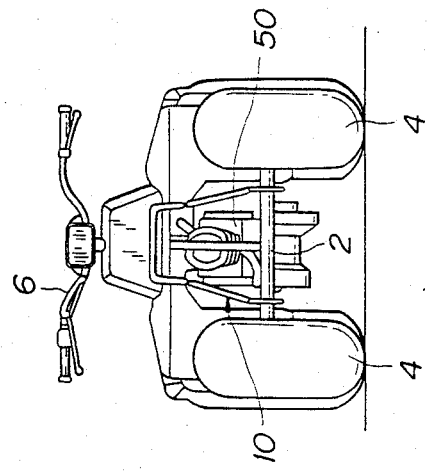
FIGS. 13, 14, 15, and 16 are side elevational views of a four-wheeled buggy with a riding saddle, having a vehicle freme according to the present invention.
Figure 16:
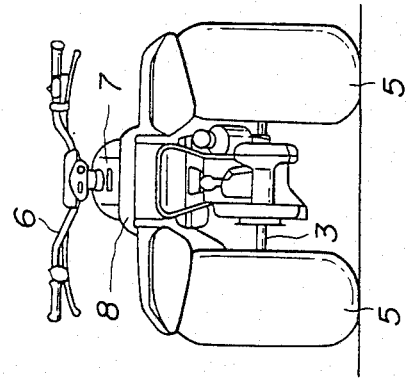
Figure 13:
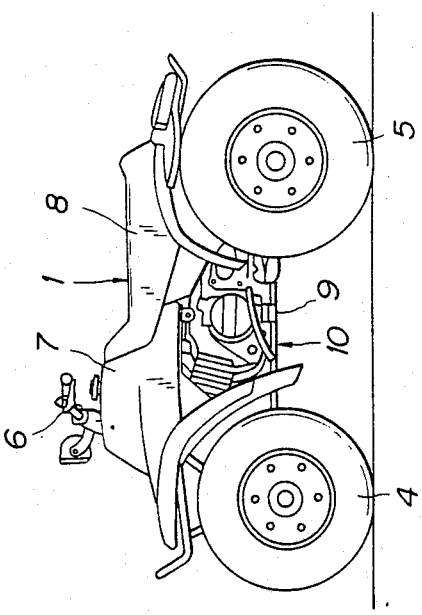

Between an appropriate position on the rear horizontal portion 12d' of the down tube 12B and the upper end 13g of the upwardly directed portion 13f of the down tube 13B (FIG. 2), there is secured a gusset pipe 18 extending obliquely for increased rigidity in the vertical direction of the main frame 11 and against tortional stresses, as shown in FIG. 12. A bracket 19 doubling as a stay having a substantially U-shaped cross section is secured between the main frame 11 and the rear horizontal portions 12d', 13d' of the down tubes 12B, 13B.

As shown in FIGS. 1 and 2, a bracket 37 supporting front wheel shaft holders 36, 36' is welded to the front curved portions 12c, 13c of the down tubes 12, 13, and brackets 39, 39' supporting holders 38, 38' by which rear wheel shafts 3 are rotatably supported are welded respectively to the rear curved portions 12e, 13e.

As illustrated in FIGS. 1 through 3, a head pipe 40 by which an upper portion of a steering shaft 42 is rotatably supported extends through a front end portion of the main frame 11, the head pipe 40 being welded together with a reinforcing bracket 41 to the main frame 11. A bar handle 6 is attached to an upper end of the steering shaft 42 with its lower end rotatably supported by a bracket 37. The lower end of the steering shaft 42 is operatively coupled to a tie rod (not shown in FIGS. 1 through 3) having opposite ends connected to two front wheels, respectively. The front wheels are steerably mounted on opposite ends of a knuckle pipe supported on the front wheel shaft holders 36, 36' and can be turned or returned by the tie rods in response to turning or returning movement of the bar handle 6, through an angle which is substantially in a one-to-one correspondence to the angle of movement of the bar handle 6.

An engine 50 is mounted in the vehicle frame 10 as indicated by dot-and-dash lines in FIG. 1. For mounting the engine 50, the gusset pipe 17 is first detatched from the vehicle frame 10, and then the engine 50 is placed in the vehicle frame 10 with upper and rear portions of a transmission case 50b being suspended from a bracket 35 attached to the main frame 11 and the bracket 19. Then, the gusset pipe 17 is attached to and between the gusset plates 20, 21 and the brackets 22, 23 on the cross pipe 16, as described above, with an engine head 50a mounted on the bracket 32. As shown in FIG. 1, front and rear carriers 55, 56 are mounted respectively on front and rear ends of the main frame 11.

With the vehicle frame construction of the foregoing embodiment for a buggy with a riding saddle, the down tubes 12, 13 are effectively reinforced by a simple arrangement wherein the gusset pipe 17 extends between and is secured to the downwardly directed portions 12b, 13b and the horizontal portions 12d, 13d of the down tubes 12, 13. Since the gusset pipes 17 are freely detachable, the engine 50 can be assembled or disassembled and maintained or serviced with ease. The down tubes 12, 13 are each divided into front and rear members which are connected by a joint. This arrangement eliminates any unwanted welding distortion which would otherwise be caused when welding the down tubes to the main frame, allowing the vehicle frame to be welded together with high dimensional accuracy. In addition, the rear gusset pipe 18 extends obliquely and is secured to the upper end 13g of the upwardly directed portion 13f of the down tube 13 and the horizontal portion 12d' of the down tube 12. Accordingly, the rigidity of the rear portion of the vehicle frame 10 is increased by the single reinforcement member in the vertical direction and against tortional stresses.

FIGS. 13 through 16 illustrate a four-wheeled vehicle or buggy with a riding saddle, incorporating the vehicle frame construction according to the present invention. The vehicle, generally indicated at 1, has a pair of front wheels 4, 4 and a pair of rear wheels 5, 5 which comprise low-pressure baloon tires for preventing lateral skidding and improving cornering on soft ground. The cornering ability is improved by selecting the diameter and width of the front wheels 4, 4 to be smaller than those of the rear wheels 5, 5. The front wheels 4, 4 are operatively coupled to a bar handle 6, identical to a bar handle on a two-wheeled motorcycle, and are angularly movable through an angle which is in a one-to-one correspondence to the angle of movement of the bar handle 6. The vehicle frame construction 10 supports thereon a fuel tank 7 and a riding saddle or seat 8 in front and rear positions, respectively. The footrests 9, 9' are positioned substantially centrally of the down tubes 12, 13 and substantially downwardly of the saddle 8.

The engine 50 is mounted substantially centrally in the vehicle frame construction 10. A power output from the engine 50 is transmitted through a chain 53 (FIG. 1) trained around sprockets 51, 52 fixed to an output shaft of the engine 50 and an axle (drive shaft) 3 of the rear wheels 5, 5 to the axle 3 for driving the rear wheels 5, 5. There is no differential mounted on the axle 3, and any difference between the speeds of rotation of the rear wheels 5, 5 at the time of turning of the vehicle is absorbed by the baloon tires as they flex. Therefore, the drive mechanism is simplified. The lack of any differential also allows the vehicle to run out of an area of soft terrain even when one of the rear drive wheels slips.

Various devices, attachments, and accessories are mounted on the vehicle frame of the four-wheeled buggy, and will now be described in detail.

Figure 17:
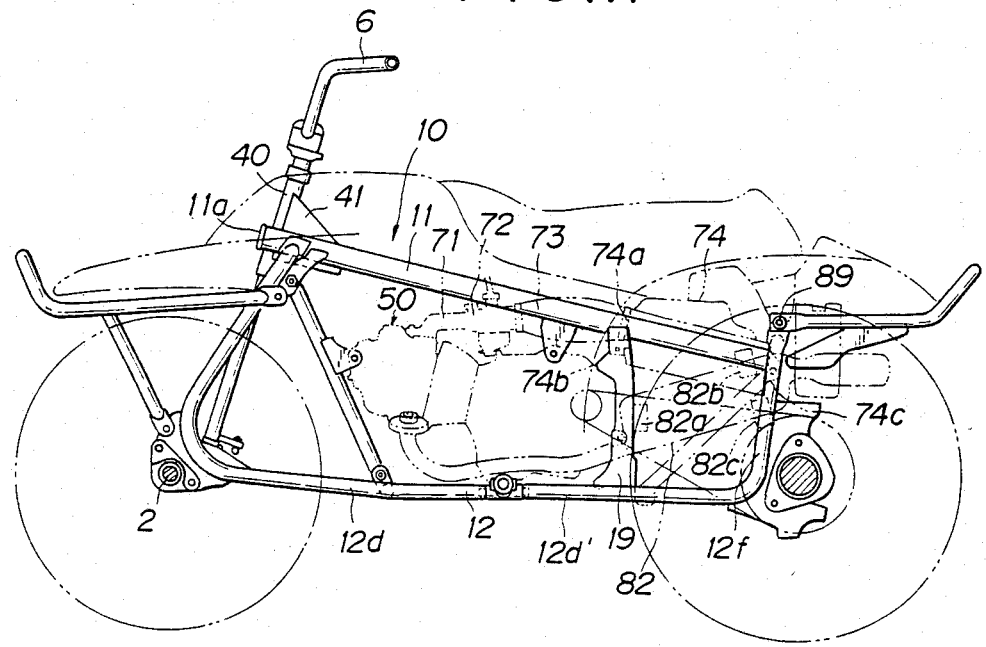
FIG. 17 is a view similar to FIG. 2, showing accessories such as an air cleaner, a muffler and others attached to the vehicle frame of FIG. 2 and indicated by two-dot-and-dash lines.
Figure 18:
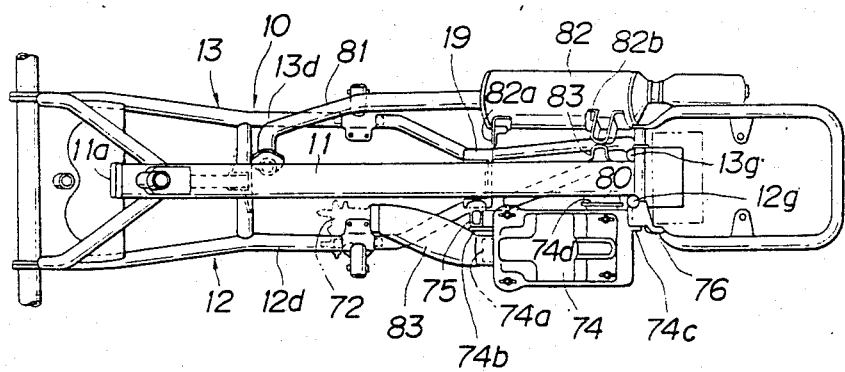
FIG. 18 is a plan view of the arrangement shown in FIG. 17.

FIGS. 17 and 18 illustrate the arrangement of an air cleaner and a muffler in specific detail. The engine 50 has an air intake pipe 71 connected to a downstream end of a carburetor 72 with its upstream end connected through a connecting tube 73 of resilient material reinforced on its outer surface with ribs to an air inlet port 74a of an air cleaner 74, thus providing an air intake system which is disposed on a lefthand side (as shown in FIG. 18) of the vehicle frame 10. The air cleaner 74 has vertical front and rear brackets 74b, 74c on longitudinal end walls thereof. The front bracket 74b is joined to a bracket 75 welded to the vertical bracket 19 which interconnects the main frame 11 and the horizontal portions 12d', 13d' of the down tubes 12, 13. The rear bracket 74c is joined to a bracket 76 welded to an upper portion of the upwardly directed portion 12f of the lefthand down tube 12. The front and rear brackets 74b, 74c are spaced a distance from the main frame 11 in parallel relation.

Figure 19:
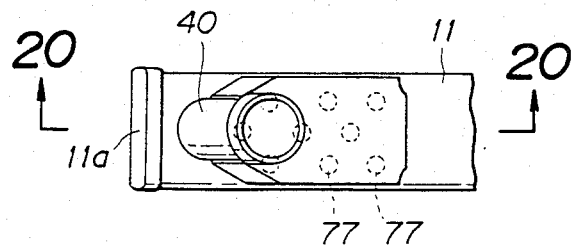
FIG. 19 is a fragmentary plan view of an air inlet duct of the air cleaner, utilizing a main frame.
Figure 20:
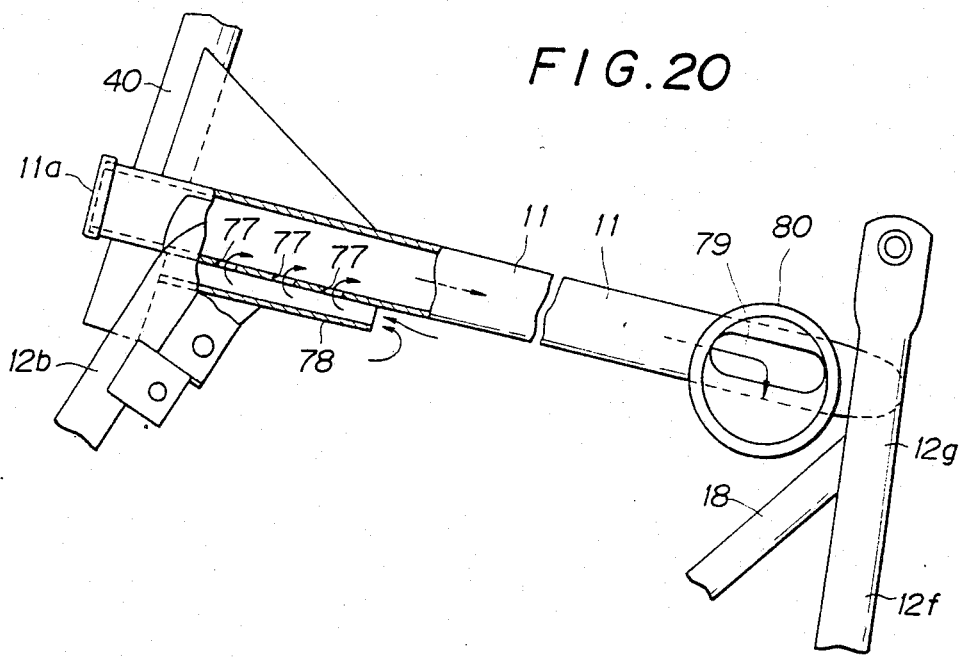
FIG. 20 is a fragmentary side elevational view of the main frame, with a portion thereof shown in cross section taken along line 20—20 of FIG. 19.

The air cleaner 74 includes an air intake duct constituted by the main frame 11 for the purposes of reducing entry of foreign matter in intake air and simplifying the construction. More specifically, as shown in FIGS. 19 and 20, the main frame 11 has a front open end closed by a cap 11a and a plurality of duct inlet holes 77 defined in a lower peripheral surface thereof immediately behind the head pipe 40. A tunnel cover 78 having a substantially C-shaped cross section is disposed below the duct inlet holes 77 and has its front end closed off by the head pipe 40. The main frame 11 also has a duct outlet hole 79 defined in a rear lefthand peripheral surface thereof and surrounded by an annular flange 80 by which the duct outlet hole 79 is connected in an airtight manner to the air inlet port 74a of the air cleaner 74.

The engine 50 has an exhaust system disposed on the righthand side (FIG. 18) of the vehicle frame construction 10. The exhaust system includes an exhaust pipe 81 and a muffler 82 connected to a rear end thereof. The muffler 82 is joined by one front bracket 82a and two rear brackets 82b, 82c to the bracket 19 and a bracket 83 of the vehicle frame 10. The muffler 82 is spaced a distance from the main frame 11 in parallel relation for preventing heat of the muffler 82 from being easily transferred to the air cleaner 74.

FIGS. 21 through 27 illustrate the arrangement in which the fuel tank and the riding saddle are attached in place.

Figure 21:
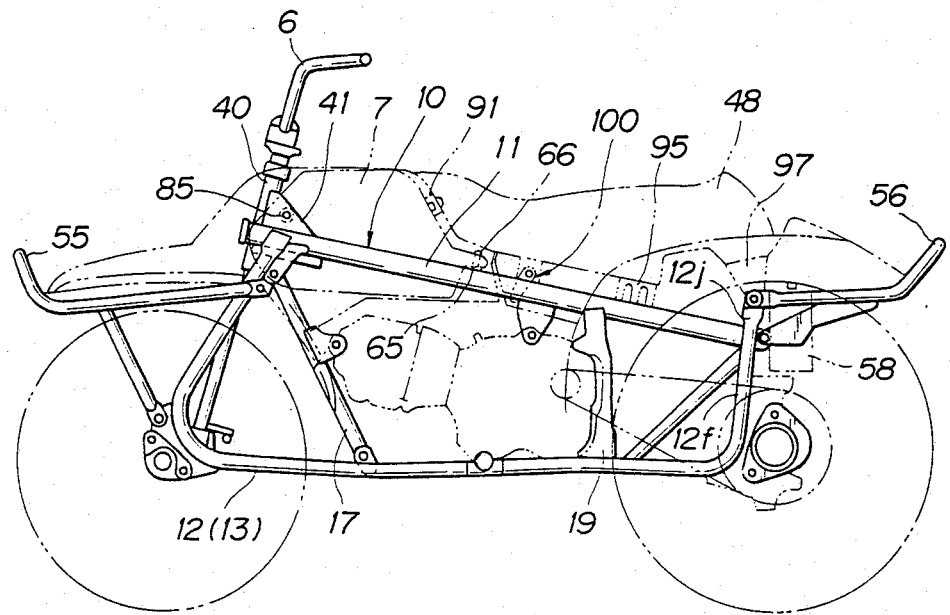
FIG. 21 is a view similar to FIGS. 2 and 17, showing the vehicle frame of FIG. 2 with a fuel tank, a riding saddle and other members attached thereto and indicated by two-dot-and-dash lines
Figure 22:
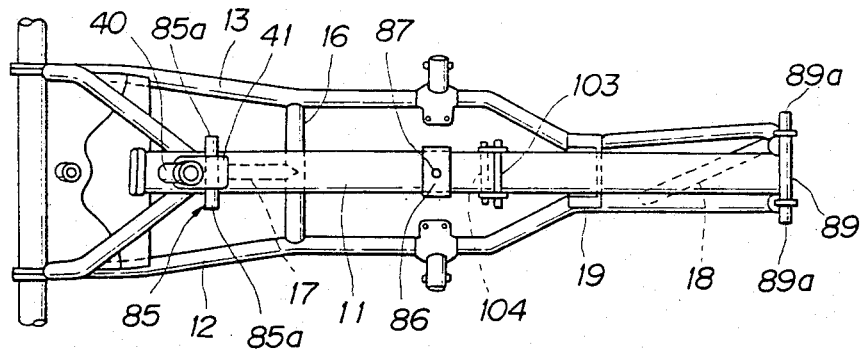
FIG. 22 is a plan view of the vehicle frame shown in FIG. 21
Figure 23:
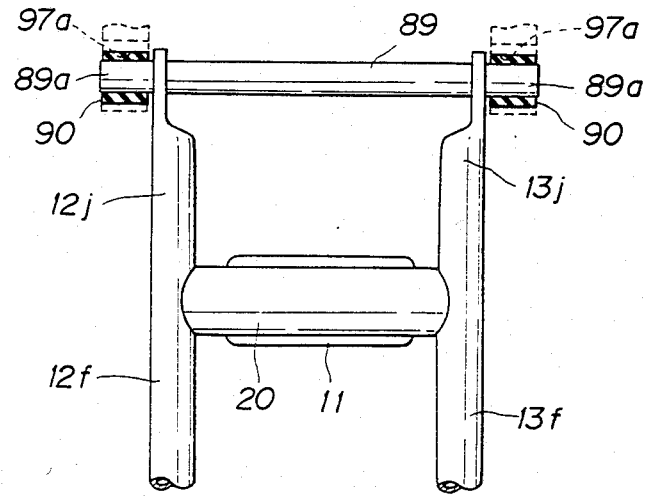
FIG. 23 is a fragmentary rear elevational view of the vehicle frame shown in FIG. 21.

In FIGS. 21 and 22, a shaft 85 having projections 85a, 85a for attachment of the fuel tank extends transversely through and is welded to the bracket 41 welded to both the head pipe 40 and the main frame 11. A bracket 86 with a bolt 87 projecting upwardly therefrom is fixed to a substantially central upper surface of the main frame 11. As shown in FIG. 23, a cross pipe 88 extends between and is welded to the upwardly directed portions 12f, 13f of the down tubes 12, 13. The rear end of the main frame 11 is welded to a front surface of the cross pipe 88. The upwardly directed portions 12f, 13f of the down tubes 12, 13 include upward extensions 12j, 13j projecting upwardly beyond the main frame 11. A saddle pipe 89 for attachment of the saddle is welded to and extends between the extensions 12j, 13j perpendicularly to the main frame 11. The saddle pipe 89 includes lateral projections 89a, 89a over which there are fitted resilient tubular members 90, 90 of rubber, for example, respectively.

Figure 24:
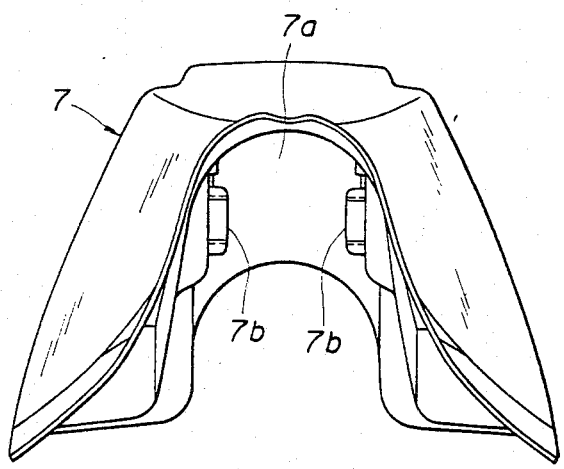
FIG. 24 is a front elevational view of a fuel tank.

As illustrated in FIG. 24, the fuel tank 7 has a recess 7a through which the main frame 11 extends, and includes a pair of C-shaped retainers 7b, 7b' opening forward and projecting inwardly toward each other. A flange 7d having a locking hole 7c defined therein is mounted on a rear end of the fuel tank 7.

The fuel tank 7 is mounted astride of the main frame 11 which is positioned in the recess 7a, with the C-shaped retainers 7b, 7b' fitted over the projections 85a, 85a of the shaft 85 from rear ends thereof. The bolt 87 on the bracket 86 is inserted through the locking hole 7c in the flange 7d, which is then fastened by a nut (not shown) threaded over the bolt 87. The fuel tank 7 is thereby fixed to the front upper portion of the main frame 11.

Figure 25:
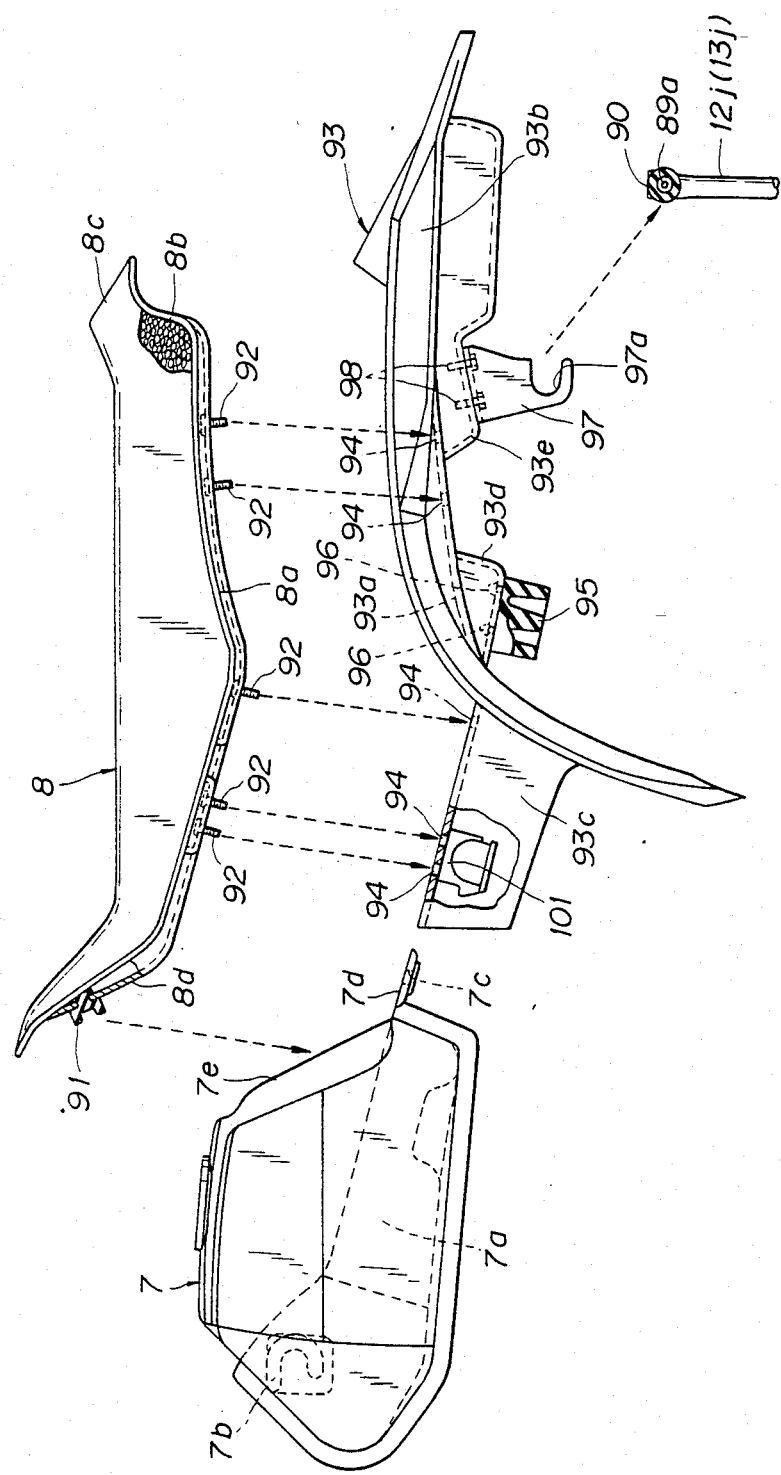
FIG. 25 is an exploded side elevational view, partly cut away, showing the manner in which a riding saddle is attached.

The riding saddle 8 as shown in FIG. 25 is composed of a bottom panel 8a of rigid synthetic resin, a cushioning member 8b placed on the bottom panel 8a, and a cover 8c covering the cushioning member 8b and secured to the bottom panel 8a fully along a marginal edge thereof. The bottom panel 8a includes a front portion 8d curved so as to extend along a rear slanted portion 7e of the fuel tank 7. Two resilient members 91, 91 as of rubber are fitted in and secured to the front portion 8d. Bolts 92 are attached to the bottom panel 8a at a plurality of locations thereon.

Figure 26:
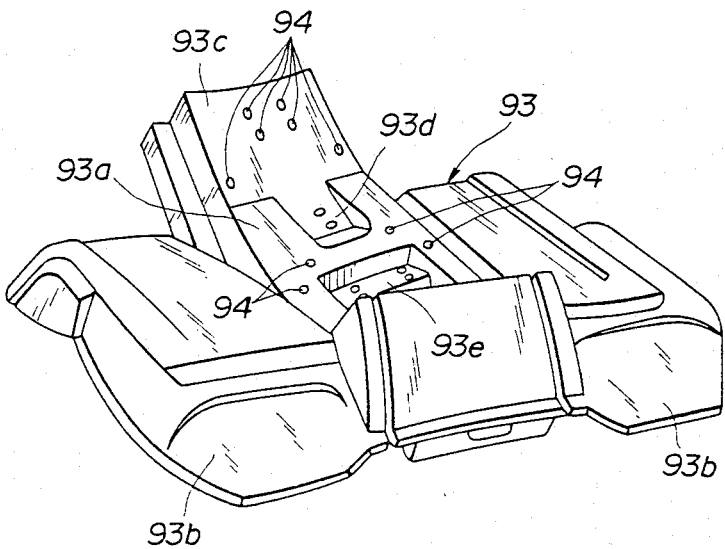
FIG. 26 is a perspective view of a rear cowl.

A rear cowl 93 is formed of plastics, for example. As shown in FIG. 26, the rear cowl 93 has an integral saddle mounting plate 93a and integral lateral rear fenders 93b, 93b.

The plate 93a includes a front extension 93c and central and rear recesses 93d, 93e defined by downwardly projecting portions. The plate 93a has holes 94 defined therein at positioned corresponding to the bolts 92 on the saddle 8.

The recess 93d is positioned so that it will be located in the vinicity of the joint between the bracket 19 and the main frame 11 and over the main frame 11, as shown in FIGS. 21 and 22, when the rear cowl 93 is attached to the vehicle frame 10. A single resilient member 95 (FIG. 25) as of rubber is mounted on the lower side of the recess 93d by projections 96 fitted therein.

A bracket 97 serving as a hook member having rearwardly opening lateral recesses 97a, 97a is fastened to the lower side of the recess 93e by bolts 98 and nuts (not shown).

Figure 27:
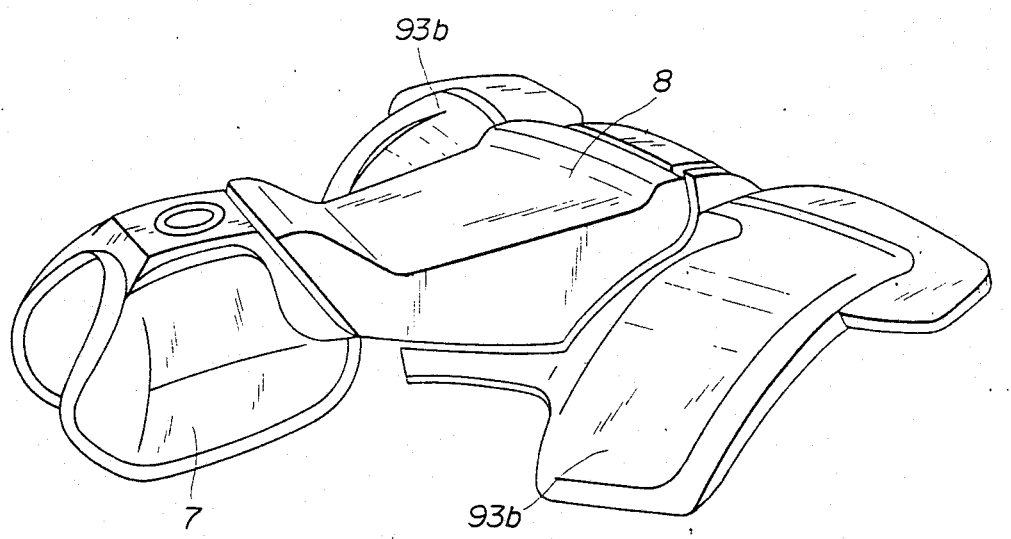
FIG. 27 is a perspective view of the rear cowl to which the riding saddle is attached.
Figure 28:
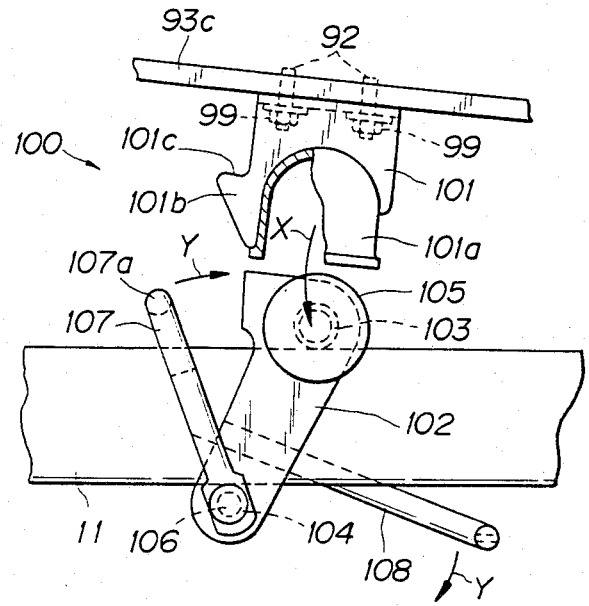
FIG. 28 is a fragmentary side elevational view showing the manner in which a saddle lock mechanism is actuated to lock the saddle.

The saddle 8 is fastened to the rear cowl 93 by the bolts 92 on the saddle 8 inserted through the holes 94 and nuts (not shown) threaded over the bolts 92. At this time, a saddle locking bracket 101 of a saddle lock mechanism 100 (described later) is attached to the saddle 8 and the rear cowl 93 by being fastened to the extension 93c by the bolts 92 and nuts 99 (FIG. 28). FIG. 27 shows the saddle 8 as mounted on the rear cowl 93.

Figure 29:
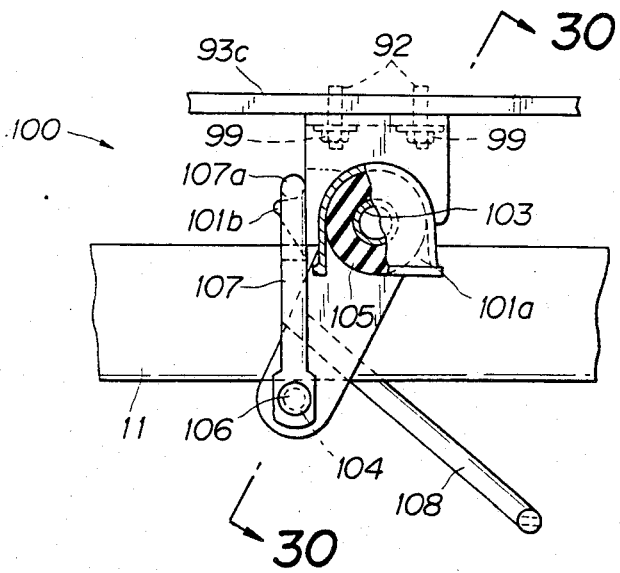
FIG. 29 is a fragmentary side elevational view of the saddle lock mechanism as it locks the saddle.
Figure 30:
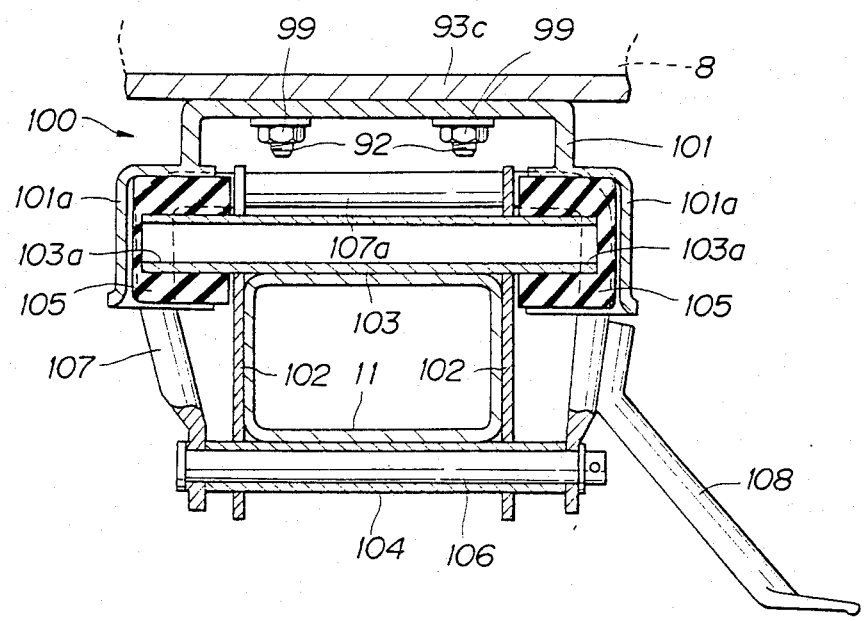
FIG. 30 is a cross-sectional view taken along line 30—30 of FIG. 29.

FIGS. 28 through 30 show the saddle lock mechanism 100. Panels 102, 102 are welded in confronting relation to opposite sides of the main frame 11 and project upwardly and downwardly. Tubes 103, 104 extend through the upwardly and downwardly projecting portions of the panels 102, 102 and are welded to the upper and lower surfaces, respectively, of the main frame 11. The tube 103 has lateral projections 103a, 103a over which resilient bottomed tubular members 105, 105 are fitted respectively.

The saddle locking bracket 101 mounted on the extension 93c of the rear cowl 93 has integral lateral holders 101a, 101a opening downwardly and holding, from above, the resilient members 105, 105, respectively, and a front projection 101b.

A pin 106 is inserted through the tube 104 for angular movement about its own axis. A substantially C-shaped locking arm 107 extends transversely across the main frame 11 has opposite ends angularly movably mounted on the pin 106 at opposite ends of the tube 104. A control arm 108 is welded to a righthand arm member (FIG. 30) of the locking arm 107.

The manner in which the rear cowl 93 with the saddle 8 fixed thereto is attached to the vehicle frame 10 will be described with reference to FIGS. 25 and 28.

The recesses 97a, 97a in the bracket 97 are fitted in a rearward direction over the resilient members 90, 90, respectively, on the ends 89a, 89a of the saddle pipe 89. The rear cowl 93, that is, the saddle 8 is now supported for swinging movement about the saddle pipe 89.

Then, the bracket 101 fixed to the saddle 8 is moved in the direction of the arrow X of FIG. 28 to cause the holders 101a, 101a to fit over the resilient members 105, 105 (FIGS. 28 through 30) secured through the tube 103 to the main frame 11. At this time, the resilient member 95 mounted on the central lower surface of the saddle 8 is held against the upper flat surface of the main frame 11, and the two resilient members 91, 91 fixed to the front lower surface of the saddle 8 are held against the rear slanted surface 7e of the fuel tank 7. The locking arm 107 is then turned in the direction of the arrow Y (FIG. 28) until an upper arm member 107a of the locking arm 107 engages in an upper recess 101c in the projection 101b to lock the saddle 8 to the vehicle frame 10.

Figure 15:
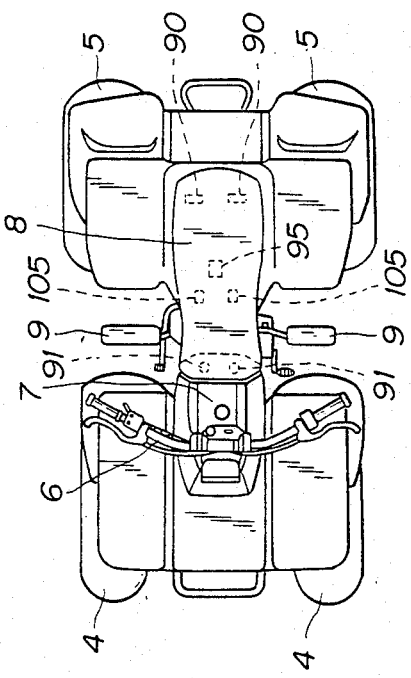

The saddle 8 is therefore supported through five points represented by the resilient members 91, 91, 95, 90, 90 as shown in FIG. 15. The saddle 8 is snugly supported especially because the central portion thereof which is subjected to a largest load is supported by the resilient member 95 directly on the flat upper surface of the main frame 11 which is rectangular in cross section, without the intermediary of any brackets.

Since the down tubes 12, 13 extend upwardly beyond the cross pipe 88 (FIG. 23) to serve as saddle mounting brackets, the vehicle frame construction is rendered lightweight and simple without having to require additional mounting members.

A battery 58 (FIG. 21) supported on the vehicle frame 10 by a bracket (not shown) is disposed below the rear cowl 93 behind the saddle 8.

Although there have been described what are at present considered to be the preferred embodiments of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A vehicle frame construction in a buggy with a riding saddle, comprising:
   (a) a main frame extending longitudinally along a central axis of the buggy, said main frame having front and rear ends;
   (b) a pair of down tubes disposed one on each side of said main frame and having one ends fixed to sides of said front end of said main frame and opposite ends fixed to sides of said rear end of said main frame;
   (c) each of said down tubes being composed of a downwardly directed portion extending downwardly from said front end of said main frame and in a forward direction of the buggy, a horizontal portion extending substantially horizontally from said downwardly directed portion in a rearward direction of said buggy, and an upwardly directed portion extending substantially vertically upwardly from said horizontal portion to said rear end of said main frame;
   (d) each of said down tubes including a curved portion between said downwardly directed portion and said horizontal portion, said downwardly directed portion and said horizontal portion having axes extending at an acute angle with respect to each other;
   (e) a first reinforcement pipe detachably coupled between said downwardly directed portion and said horizontal portion of each of said down tubes;

(f) a cross pipe extending transversely of said buggy and interconnecting said horizontal portions of the down tubes, said first reinforcement pipe being coupled to said horizontal portions through said cross pipe;

(g) a pair of mutually confronting gusset plates joined between said one ends of said down tubes and said sides of said front end of said main frame, a pair of brackets mounted on a substantially central upper surface of said cross pipe and having confronting surfaces, said first reinforcement pipe having one end coupled between said gusset plates and an opposite end coupled between said brackets; and (h) short pipes extending transversely of said buggy and connected respectively to said one and opposite ends of said first reinforcement pipe, said short pipes being fastened to said gusset plates and said brackets by bolts extending through said short pipes.

2. A vehicle frame construction according to claim 1, wherein said main frame comprises a pipe of a rectangular cross section, each of said down tube comprising a pipe of a round cross section.

3. A vehicle frame construction according to claim 1, wherein each of said down tubes comprises front and rear members separated from each other at a substantially central portion of said horizontal portion and interconnected by a joint.

4. A vehicle frame construction according to claim 1, wherein said pair of down tubes comprises first and second down tubes, including a second reinforcement pipe extending obliquely between and fixed to said horizontal portion of said first down tube and an upper end of said upwardly directed portion of said second down tube.

5. A vehicle frame construction in a buggy with a riding saddle comprising:

a main frame extending longitudinally along the central axis of the buggy and having front and rear ends, a pair of down tubes having one ends fixedly attached to said front end of the main frame and the other ends fixedly attached to said rear end of the main frame;

each of said down tubes including a downwardly directed portion extending generally downwardly from said front end of the main frame, a front horizontal portion extending substantially horizontally and rearwardly from said downwardly directed portion and a rear horizontal portion extending horizontally and rearwardly from said front horizontal portion, and an upwardly directed portion extending substantially vertically and upwardly from said rear horizontal portion to said rear end of the main frame;

each of said down tubes including a curved portion between said downwardly directed portion and said front horizontal portion, said downwardly directed portion and said front horizontal portion having axes extending at an acute angle with respect to each other;

a first reinforcement pipe detachably coupled between said downwardly directed portion and said front horizontal portion of each of the down tubes;

joints for connecting said front and rear horizontal portions; and footrests connected to said respective joints.

6. A vehicle frame construction as set forth in claim 5, wherein said footrests are detachably connected to said joints, respectively.

* * * * *